(12) United States Patent
Chen et al.

(10) Patent No.: US 11,572,996 B1
(45) Date of Patent: Feb. 7, 2023

(54) VEHICLE LAMP ASSEMBLY

(71) Applicant: Ford Global Technologies, LLC, Dearborn, MI (US)

(72) Inventors: Linsheng Chen, Novi, MI (US); Ricardo Filho, Fauro de Freitas (BR); Robert William Miller, Inkster, MI (US); Edson Hiroshi Otuka, Fauro de Freitas (BR)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/834,032

(22) Filed: Jun. 7, 2022

(51) Int. Cl.
| | |
|---|---|
| *F21S 41/265* | (2018.01) |
| *F21S 41/143* | (2018.01) |
| *F21S 41/24* | (2018.01) |
| *F21S 41/27* | (2018.01) |

(52) U.S. Cl.
CPC .......... *F21S 41/265* (2018.01); *F21S 41/143* (2018.01); *F21S 41/24* (2018.01); *F21S 41/27* (2018.01)

(58) Field of Classification Search
CPC .......... F21S 41/265; F21S 41/24; F21S 41/27; F21S 41/143
See application file for complete search history.

(56) References Cited

U.S. PATENT DOCUMENTS

| | | | |
|---|---|---|---|
| 8,534,879 B2 * | 9/2013 | Chang | F21V 5/08 362/311.06 |
| 9,102,271 B2 | 8/2015 | Trombley et al. | |
| 10,458,614 B2 * | 10/2019 | Kim | F21S 41/265 |
| 11,041,604 B2 | 6/2021 | Chen | |
| 11,220,210 B1 | 1/2022 | Chen | |
| 11,285,768 B2 | 3/2022 | Nieiadomski et al. | |
| 2007/0230190 A1 * | 10/2007 | Sasaki | F21V 5/04 362/335 |
| 2022/0107068 A1 * | 4/2022 | Lim | F21S 41/255 |

* cited by examiner

*Primary Examiner* — Matthew J. Peerce
(74) *Attorney, Agent, or Firm* — Frank Lollo; Price Heneveld LLP (57) ABSTRACT

A vehicle lamp assembly includes an LED disposed on a circuit board, a light collimator operatively coupled to the LED to generate a beam of collimated light, a light pipe operatively coupled to light collimator to transmit the collimated beam of light, and a hybrid optic lens operatively coupled to the light pipe to diverge the collimated beam of light into a beam pattern. The hybrid optic lens includes a plurality of curved lenses for outputting light in a first direction, a first prism lens formed on a lower portion of the curved lenses for directing light downward in a second direction, and a second prism lens provided on a lateral side of curved lenses for directing light sideways in a third direction. An enhanced light illumination with uniform lighting pattern in the trailer hitch target region is achieved for operation of a trailer with the vehicle.

20 Claims, 5 Drawing Sheets

VEHICLE LAMP ASSEMBLY

FIELD OF THE DISCLOSURE

The present disclosure generally relates to vehicle lighting, and more particularly relates to vehicle lighting for illuminating a target region to be captured with camera imaging.

BACKGROUND OF THE DISCLOSURE

Motor vehicles are commonly equipped with light illumination systems for illuminating a target region proximate to the vehicle. For example, motor vehicles that are commonly equipped with trailer hitches and cameras for capturing images of the trailer may employ one or more lamps such as vehicle backup lamps to illuminate a target region proximate to the trailer and the hitch. It would be desirable to provide an enhanced light illumination with a uniform lighting pattern in the target region.

SUMMARY OF THE DISCLOSURE

According to a first aspect of the present disclosure, a lamp assembly is provided. The lamp assembly includes a circuit board, a light source disposed on the circuit board, a light collimator operatively coupled to the light source to generate a collimated beam of light, and a hybrid optic lens operatively coupled to receive the collimated beam of light and output the light in a beam pattern. The hybrid optic lens includes a plurality of curved lenses each having a curved surface for outputting light within the beam pattern in a first direction, a first prism lens formed on a first side of at least some of the plurality of the curved lenses for directing light in a second direction, and a second prism lens provided on a lateral second side of at least some of the plurality of curved lenses for directing light in a third direction.

Embodiments of the first aspect of the present disclosure can include any one or a combination of the following features:
- a light pipe operatively coupled between the light collimator and the hybrid optic lens to transmit the beam of collimated light;
- the light pipe comprises a straight light pipe;
- the hybrid optic lens is integrally formed with the light pipe;
- the light collimator is integrally formed with the light pipe;
- the curved surface of each of the plurality of curved lenses provides a pillow lens;
- the hybrid optic lens diverges the light to form a divergent beam pattern;
- the light source comprises an LED;
- the lamp assembly is located on a vehicle;
- the lamp assembly is located to illuminate light rearward of the vehicle; and
- the lamp assembly is oriented downward at an angle relative to the vehicle.

According to a second aspect of the present disclosure, a vehicle lamp assembly is provided. The vehicle lamp assembly includes a circuit board, an LED disposed on the circuit board, a light collimator operatively coupled to the LED to generate a beam of collimated light, a light pipe operatively coupled to light collimator to transmit the collimated beam of light, and a hybrid optic lens operatively coupled to the light pipe to receive the collimated beam of light and output the light in a divergent beam pattern. The hybrid optic lens includes a plurality of curved lenses each having a curved surface for outputting light within the divergent beam pattern in a first direction, a first prism lens formed on a lower portion of at least some of the plurality of curved lenses for directing light downward in a second direction, and a second prism lens provided on a lateral side of at least some of the plurality of curved lenses for directing light sideways in a third direction.

Embodiments of the second aspect of the present disclosure can include any one or a combination of the following features:
- the lamp assembly is oriented to illuminate light rearward of the vehicle; and
- the lamp assembly is oriented downward at an angle relative to the vehicle.

According to a third aspect of the present disclosure, a vehicle is provided that includes a body, an imaging device, and a lamp assembly. The lamp assembly including a circuit board, a light source disposed on the circuit board, a light collimator operatively coupled to the light source to generate a beam of collimated light, and a hybrid optic lens operatively coupled to receive the collimated light. The hybrid optic lens including a plurality of curved lenses each having a curved surface for generating a beam pattern in a first direction, a first prism lens formed on a first side of at least some of the plurality of optical element lenses for directing light in a second direction, and a second prism lens located on a lateral side of at least some of the plurality of optical members for directing light sideways in a third direction.

Embodiments of the third aspect of the present disclosure can include any one or a combination of the following features:
- the vehicle further comprises a trailer hitch, wherein the light illuminates a region proximate to the trailer hitch;
- the vehicle further comprises a trailer backup assist system for assisting with the operation of a trailer with the vehicle;
- the imaging device and the lamp assembly are located on the vehicle to capture images in the region rearward of the vehicle;
- the imaging device and the lamp assembly are laterally offset from one another; and
- the lamp assembly further comprises a light pipe, operatively coupled between the light collimator and the hybrid optic lens to transmit the beam of collimated light, wherein the hybrid optic lens diverges the light to form a divergent beam pattern.

These and other features, advantages, and objects of the present invention will be further understood and appreciated by those skilled in the art by reference to the following specification, claims, and appended drawings.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
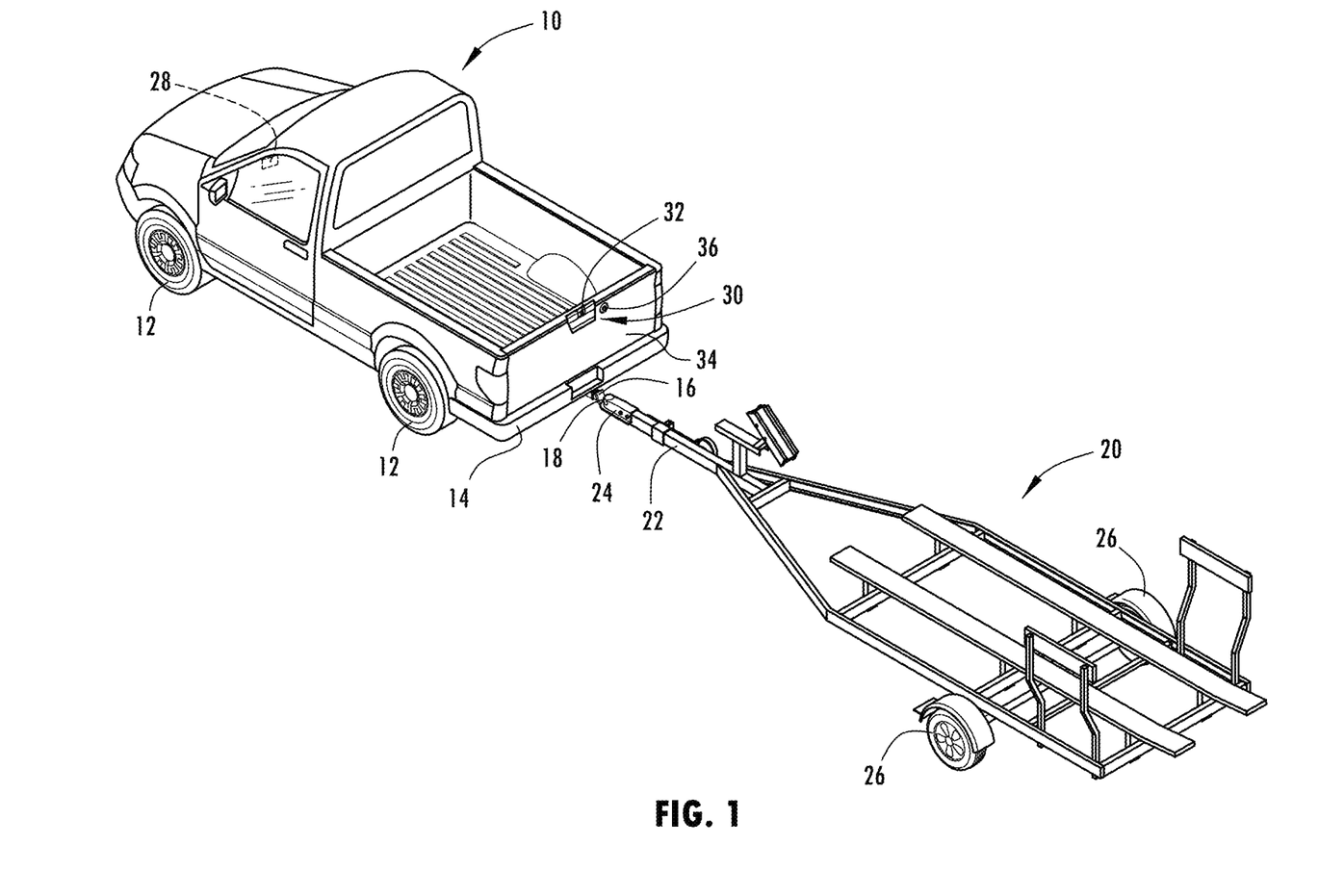
FIG. 1 is a perspective view of a motor vehicle having a trailer hitch connected to a trailer and a lamp assembly for use with a trailer detection system, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle and lamp assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIG. 1, a vehicle 10 is generally illustrated as a motor vehicle having road wheel assemblies 12 for travel on the ground, such as a roadway. The motor vehicle 10 is shown equipped with a vehicle trailer hitch 16 generally mounted or assembled to the rear end 14 of the vehicle 10. The vehicle trailer hitch 16 generally includes a tow bar extending from a bracket and having a hitch connecting feature such as a tow ball 18. The tow ball 18 is shown connected to a trailer 20. The trailer 20 has a trailer tongue 22 extending forward towards the front end with a trailer coupler 24 provided on the front end thereof. The trailer coupler 24 is configured to matingly engage and releasibly lock onto the tow ball 18 on the vehicle trailer hitch 16 to connect the trailer 20 to the vehicle 10 and allow the trailer 20 to articulate about the coupler to hitch connection as the vehicle 10 maneuvers with left and right steering directions while travelling. The trailer 20 may be configured in various configurations and has road wheel assemblies 26 as is generally known in the art.

The vehicle 10 shown is equipped with a trailer detection system 30 for monitoring and detecting the trailer 20 connected to the vehicle trailer hitch 16. The trailer detection system 30 includes an imaging system 32 shown as a camera which is shown located at the rear end 14 of the vehicle 10 and oriented to capture images of the vehicle trailer hitch 16 from an imaging perspective directed rearward of the vehicle 10. The imaging system 32 is an image generating device that is shown located in a central upper portion of a tailgate 34 of the vehicle 10 which is shown configured as a pick-up truck in one example. The imaging system 32 may be oriented vehicle rearward and downward at an angle to capture images proximate the hitch and rearward of the vehicle. It should be appreciated that the imaging system 32 may be located at other locations on any vehicle that enables the capture of images in an imaging region proximate the vehicle 10. The captured images may be displayed on a display and may be stored in memory and processed by a controller of the trailer detection system 30 for use in connecting the trailer to the vehicle, maneuvering the trailer 20 with the vehicle 10 including backing up the trailer 20 and monitoring the trailer 20 and other objects rearward of the vehicle 10, and assisting with hitching the trailer 20 to the vehicle 10.

The trailer detection system 30 may include a human machine interface (HMI) in the form of a touchscreen display 36 shown located within a passenger compartment of the vehicle 10. The display 36 may be located in a position that is readily viewable by a driver of the vehicle 10 and may display captured images from the imaging system 32 and may provide visual notifications such as warnings as an output. In one example, the display 36 is provided within an entertainment system located within the dashboard of the vehicle 10 generally forward of the driver. The HMI display or other device(s) within vehicle 10 may provide other outputs such as audible and/or visible outputs.

In addition, the trailer 20 may have identifiable features or targets including one or more stickers placed on the trailer 20 such as the trailer tongue 22. The features or targets may be stickers with a designated printed pattern that are adhered to the trailer tongue or may be features of the trailer tongue 22 such as trailer edges, corners, etc., for example. The imaging system 32 may process the captured images acquired by the camera and identify the presence of one or more targets on the trailer 20. By identifying the location and size of each target, the processed images containing the target or targets may be used to determine the hitch angle, the position of the trailer relative to the vehicle, and the presence of other objects.

Figure 2:
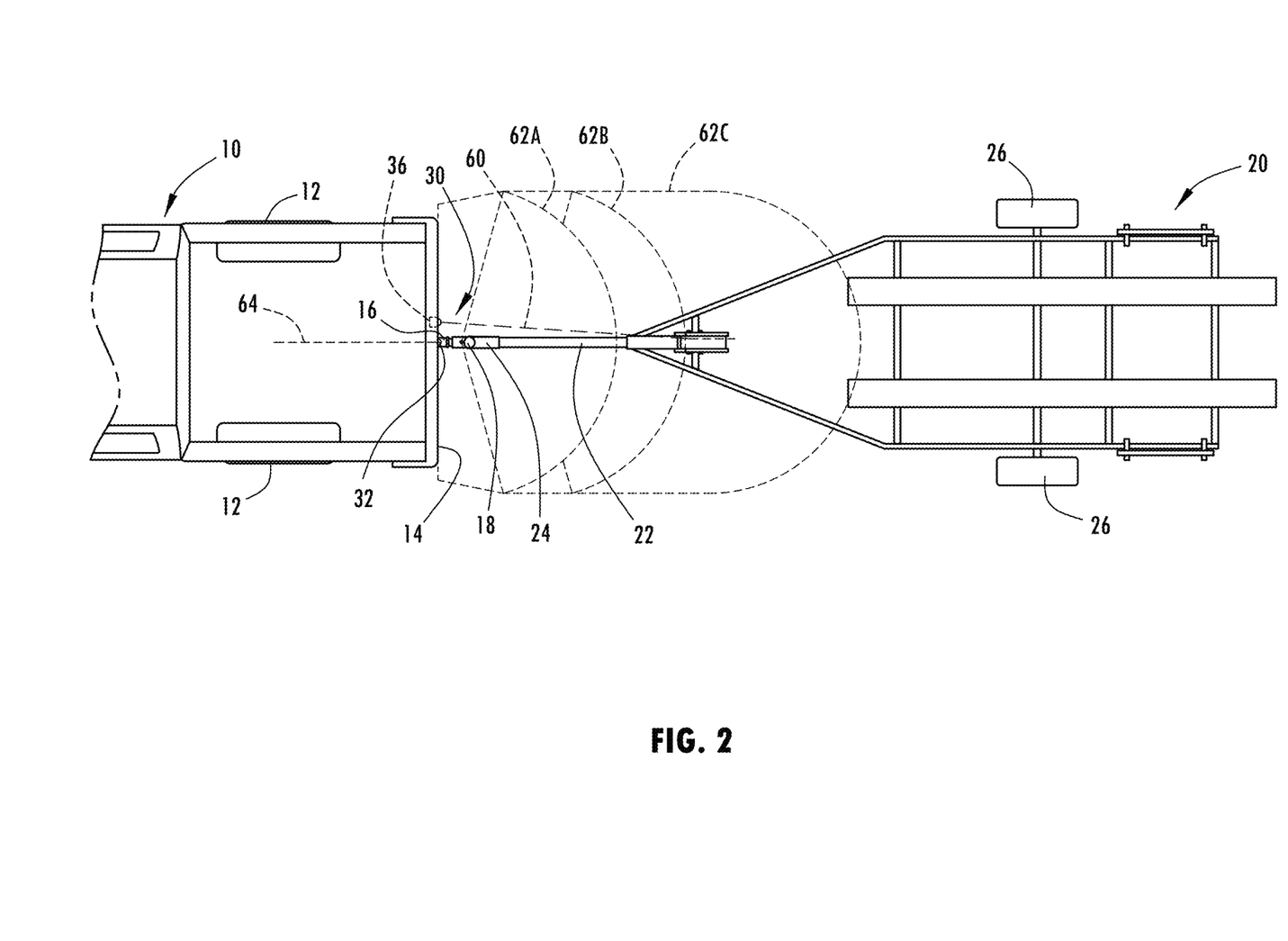
FIG. 2 is a top view of the vehicle and trailer overlaid with a light illumination zone provided by the lamp assembly, according to one embodiment.

The vehicle 10 is further equipped with a lamp assembly 36 located near the rear end 14 of the vehicle 10 and oriented to illuminate a target region rearward of the vehicle 10, such as a region including at least a portion of the trailer 20. The lamp assembly 36 is shown located in the tailgate 34 and laterally offset from the imaging device 32. The lateral offset of the lamp assembly 36 and camera 32 are further illustrated in FIG. 2. The imaging system 32 is aligned along a longitudinal axis 64 of the vehicle 10 and is located centrally within the rear end or tailgate 34 of the vehicle 10. The lamp assembly 36 is located offset to one side of the imaging system 32 and is aligned along a light illumination axis 60 which is aligned at an angle relative to the longitudinal axis 64. The lamp assembly 36 generates a divergent beam pattern that illuminates a target region within a lamp illumination zone shown by zones 62A, 62B and 62C. The light in the illumination zones include a first or high light intensity lamp illumination zone 62A, a second or medium light intensity lamp illumination zone 62B and a third or low light intensity lamp illumination zone 62C. Each of the lamp illumination zones are focused centrally upon the target region to cover the imaging region which is where the imaging device 32 is oriented to enhance the lighting in the captured images. As a result, the lamp assembly 36 provides light illumination in a beam pattern that is more uniform and exhibits reduced glare. In one example, the lamp assembly 36 is offset from the imaging system 32 by approximately 10-20 cm. However, it should be appreciated that other offset distances in either lateral direction or any direction may be employed.

Figures 3, 4:
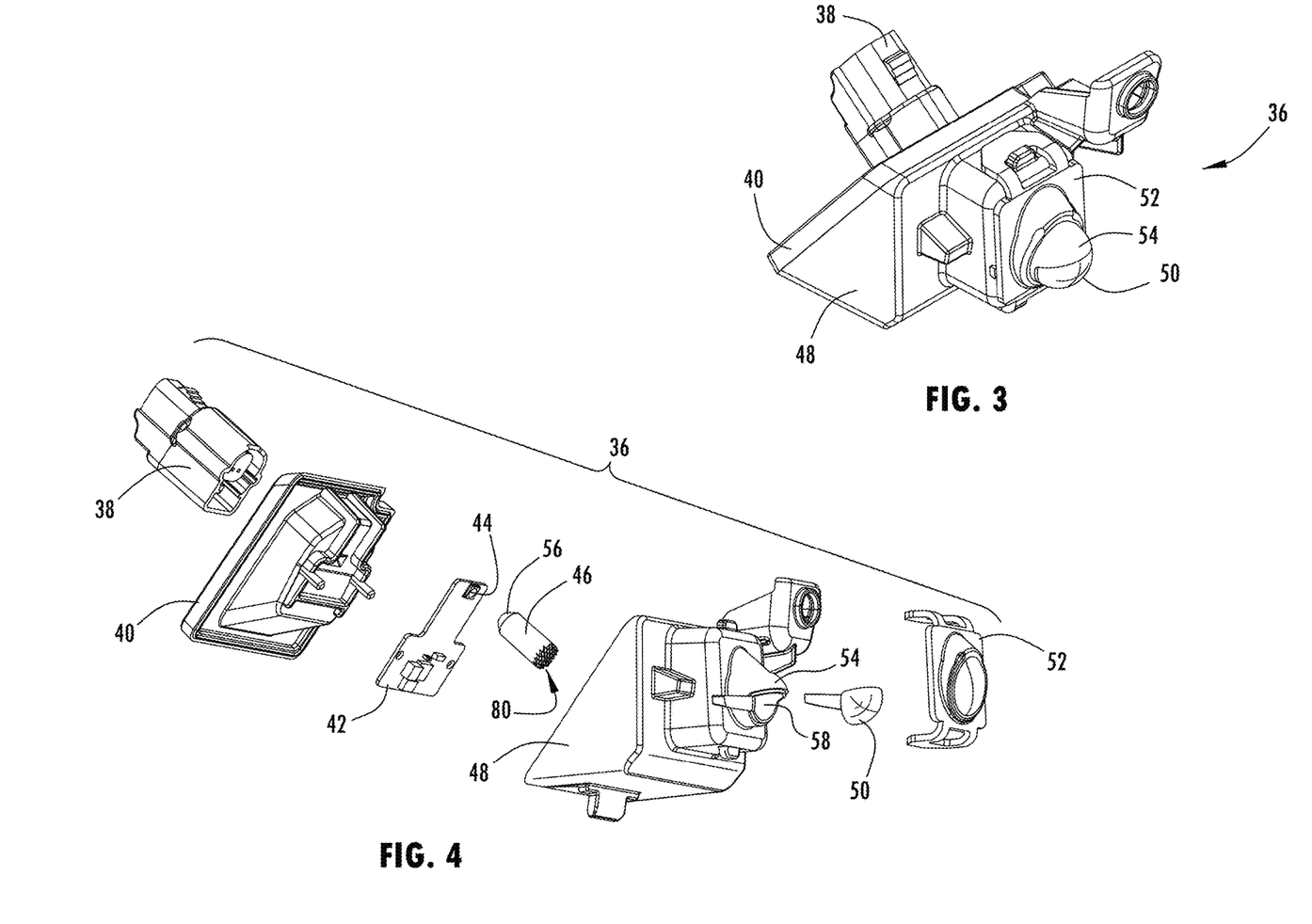
FIG. 3 is an enlarged perspective view of the lamp assembly employed on the vehicle as shown in FIG. 1.
FIG. 4 is an exploded view of the lamp assembly shown in FIG. 3.

The lamp assembly 36 is further illustrated in FIGS. 3 and 4, according to one example. The lamp assembly 36 includes a rear housing 40 that connects to a front housing 48 to provide an enclosed housing that contains various components. Connected at the rear of the rear housing 40 is an electrical connector 38 that allows for the electrical connection to supply power from a power supply such as the vehicle battery to the lamp assembly 36. Connector 38 may include a standard electrical connector. Housed within the rear and front housings 40 and 48 is a printed circuit board 42 which includes a substrate and electrical circuitry. A light source 44, such as a light-emitting diode (LED) is mounted on the printed circuit board 42. It should be appreciated that one or more LEDs or other light sources and other electrical circuit components may be provided on the circuit board 42.

The lamp assembly 36 includes a light pipe 46 and a light collimator 56 disposed between the light source 44 and the input end of the light pipe 46. The light pipe 46 may have the light collimator 56 integrally formed at the input end and aligned with the light source 44. The light pipe 46 is configured as a straight light pipe in one embodiment. An optic hybrid lens 80 in the form of a plurality of optical elements is provided at the output end of the light pipe 46. The light pipe 46 and hybrid optic lens 80 extend through opening 58 in the front housing 48. The front side of the front housing 48 has a downward angled light shield 54 which shields the light and align the light pipe 46 at a designated angle, such as 38° downward, for example. An outer lens 50 covers the plurality of optical elements. A front cover 52 attached to the light output side of the front housing 48 with the output end of the light pipe 46, hybrid optic lens and outer lens 50 extending through an opening therein.

Figure 5:
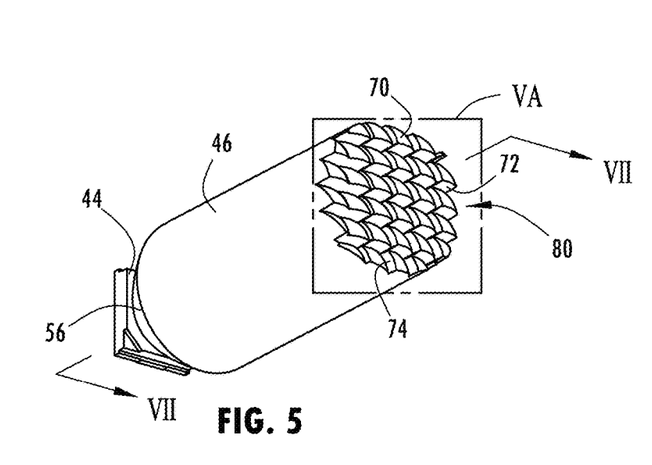
FIG. 5 is a lower left side perspective view of a light source operatively coupled to a light pipe with optics used in the lamp assembly, according to one embodiment.
Figures 5A, 6A:
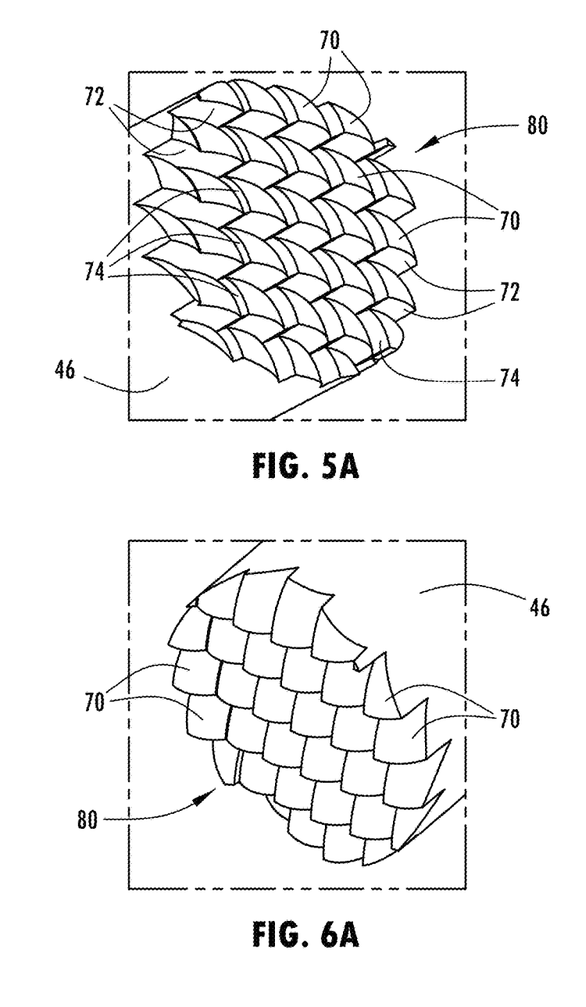
FIG. 5A is an enlarged view of section VA in FIG. 5 showing the optics having curved lens elements and first and second prisms, according to one embodiment.
FIG. 6A is an enlarged view of the section VIA taken in FIG. 5 further illustrating the curved lens elements.
Figure 6:
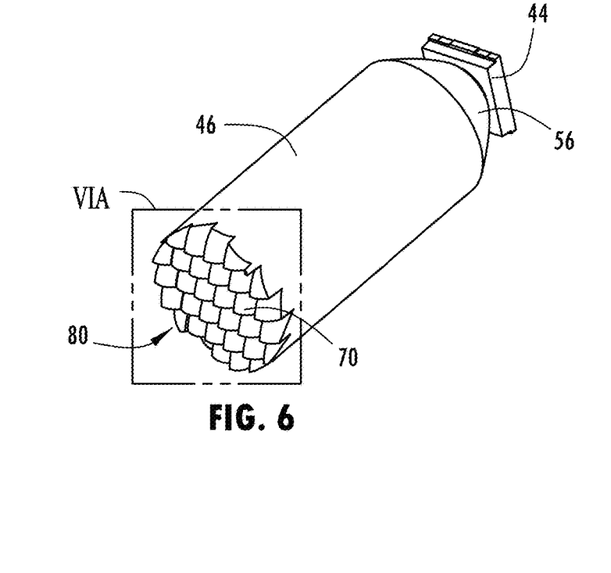
FIG. 6 is an upper right side perspective view of the light source and light pipe with the optics shown in FIG. 5.

The light pipe 46 is operatively coupled with the light source 44 and light collimator 56 and is further illustrated in FIGS. 5-6A. As seen in FIG. 5, the light source 44 which is mounted on the circuit board is aligned with the light collimator 56 which operates to change the light output from the light source 44 to a collimated beam of light and transmits the collimated beam of light to the light pipe 46. The light collimator 56 may be integrally formed with the light pipe 46. The light pipe 46 transmits the collimated beam of light from the input end to the output end which has the hybrid optic lens 80 formed with a plurality of curved lenses 70 each having a curved surface which serves as a divergent lens, such as a pillow lens. The curved lenses 70 spread out the beam of light such that the light diverges into an illuminated divergent beam pattern that is directed towards a target illumination zone. Each of the curved lenses 70 of the hybrid optical lens 80 further has a first prism lens 72 formed on a first side or bottom thereof to refract light downward in a first direction onto a first region. It should be appreciated that all or only some of the optical elements may include the first prism lens 72 and that some of the optical elements may not include the first prism lens 72.

The curved lenses 70 of the hybrid optical lens 80 further include a plurality of second prism lenses 74 formed on a second side or lateral side of the optical elements to refract light to the side, such as the right, in a second direction onto a second region. The second prism lens 74 may be provided on all or only some of the side walls of the curved lenses and not provided on other optical elements to obtain a desired light pattern beam. As can be seen in FIGS. 5 and 5A, the first prism lens 72 and the second prism lens 74 are provided on the bottom and left sides, respectively. Referring to FIGS. 6 and 6A, the curved lenses 70 have curved surfaces on the left side such that the first prism 72 and second prism 74 are not present on the top or right side.

The curved lenses 70 of the hybrid optical lens 80 each have a curved surface at the outer end which spreads out the collimated beam of light within a divergent beam pattern in a first direction to illuminate a target illumination zone. The first prism lens 72 may be formed by forming V-shaped grooves in the lower surface of the curved lens 70 or by curving the lower surface of the curved lens to direct light in a second direction to regions within the target illumination zone. Similarly, the second prism lens 74 may be formed by forming V-shape notches in the one side of the curved lenses 70 or forming a curved surface in the one side of the curved lenses 70 to obtain a desired light pattern directed to the one side in a third direction.

The light collimator 56, light pipe 46 and optics forming the hybrid optic lens 80 may be integrally formed, according to one embodiment. The light collimator 56 may be formed of a light transmissive medium that aligns the light rays to be substantially parallel to one another to provide a collimated light beam. The light pipe 46 may be made of a light transmissive medium operatively configured to receive the collimated beam of light and to distribute the collimated beam of light from the input end to the output end. The light pipe 46 may have a somewhat cylindrical shape having a diameter in the range of about 5-10 mm and more particularly around 6.5 mm, according to one example. The light pipe 46 may have a length of about 2-20 cm, for example. The light pipe medium may include a transparent and rigid plastic, such as polymethyl methacrylate (PMMA), which is a synthetic resin produced from the polymerization of methacrylate. The light pipe 46 may have an index of refraction of about 1.5, according to one example. According to another example, the light transmissive medium may include a thermoplastic polymeric, such as polycarbonate. The light pipe 46 may be formed in a mold using an injection molding process and may be molded together with the light collimator 56 and hybrid lens.

The outer lens 50 is positioned in front of the hybrid lens 80. The outer lens 50 may have an inside lens diameter of about 10 mm and an outside diameter of about 12.8 mm, according to one example. The outside lens 50 may be a clear transparent lens that protects the optics including the hybrid optical lens 80.

Figure 7:
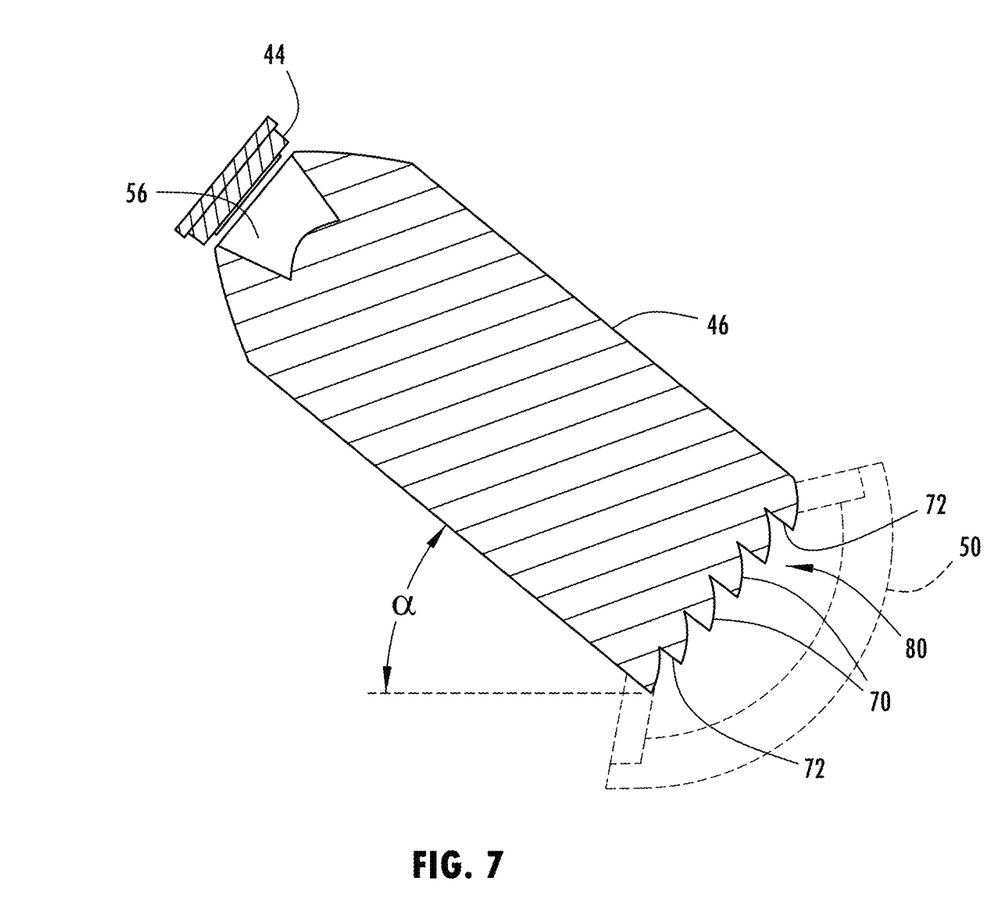
FIG. 7 is a cross-sectional view of the light source and light pipe with optics taken through line VI-VI of FIG. 5.

Referring to FIG. 7, the arrangement of the light pipe 46, the light source 44, the light collimator 56 and the hybrid optics lens 80 are further illustrated oriented at an angle α relative to a horizontal axis. In one example, angle α is in a range 0-90°. Accordingly to another example, angle α is in a range of 10-75°. In a further example, angle α is in a range of 30-45°. In one specific example, angle α is set at approximately 38°. The downward orientation of the lamp assembly components allows for illumination of a target illumination region extending rearward of the vehicle and downward at an angle towards the ground.

Accordingly, the lamp assembly 36 advantageously provides for enhanced light illumination that is particularly useful for assisting with imaging an area rearward of a vehicle, such as in the vicinity of a trailer. The lamp assembly 36 may be offset from the imaging device 32 and provides for a light beam pattern having reduced glare and a more uniform illumination pattern. The lamp assembly 36 may be particularly useful for assisting with maneuvering a trailer backwards or connecting a trailer or providing images in a region rearward of the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A lamp assembly comprising:
a circuit board;
a light source disposed on the circuit board;
a light collimator operatively coupled to the light source to generate a collimated beam of light; and
a hybrid optic lens operatively coupled to receive the collimated beam of light and output the light in a beam pattern, the hybrid optic lens comprising:
a plurality of curved lenses each having a curved surface for outputting light within the beam pattern in a first direction;
a first prism lens formed on a first side of at least some of the plurality of the curved lenses for directing light in a second direction; and
a second prism lens provided on a lateral second side of at least some of the plurality of curved lenses for directing light in a third direction.

2. The lamp assembly of claim 1 further comprising a light pipe operatively coupled between the light collimator and the hybrid optic lens to transmit the beam of collimated light.

3. The lamp assembly of claim 2, wherein the light pipe comprises a straight light pipe.

4. The lamp assembly of claim 3, wherein the hybrid optic lens is integrally formed with the light pipe.

5. The lamp assembly of claim 4, wherein the light collimator is integrally formed with the light pipe.

6. The lamp assembly of claim 1, wherein the curved surface of each of the plurality of curved lenses provides a pillow lens.

7. The lamp assembly of claim 1, wherein the hybrid optic lens diverges the light to form a divergent beam pattern.

8. The lamp assembly of claim 1, wherein the light source comprises an LED.

9. The lamp assembly of claim 1, wherein the lamp assembly is located on a vehicle.

10. The lamp assembly of claim 9, wherein the lamp assembly is located to illuminate light rearward of the vehicle.

11. The lamp assembly of claim 10, wherein the lamp assembly is oriented downward at an angle relative to the vehicle.

12. A vehicle lamp assembly comprising:
a circuit board;
an LED disposed on the circuit board;
a light collimator operatively coupled to the LED to generate a beam of collimated light;

a light pipe operatively coupled to light collimator to transmit the collimated beam of light; and a hybrid optic lens operatively coupled to the light pipe to receive the collimated beam of light and output the light in a divergent beam pattern, the hybrid optic lens comprising:
- a plurality of curved lenses each having a curved surface for outputting light within the divergent beam pattern in a first direction;
- a first prism lens formed on a lower portion of at least some of the plurality of curved lenses for directing light downward in a second direction; and
- a second prism lens provided on a lateral side of at least some of the plurality of curved lenses for directing light sideways in a third direction.

13. The lamp assembly of claim 12, wherein the lamp assembly is oriented to illuminate light rearward of the vehicle.

14. The lamp assembly of claim 13, wherein the lamp assembly is oriented downward at an angle relative to the vehicle.

15. A vehicle comprising:
a body;
an imaging device; and
a lamp assembly comprising:
- a circuit board;
- a light source disposed on the circuit board;
- a light collimator operatively coupled to the light source to generate a beam of collimated light; and
- a hybrid optic lens operatively coupled to receive the collimated light, the hybrid optic lens comprising:
  - a plurality of curved lenses each having a curved surface for generating a beam pattern in a first direction;
  - a first prism lens formed on a first side of at least some of the plurality of optical element lenses for directing light in a second direction; and
  - a second prism lens located on a lateral side of at least some of the plurality of optical members for directing light sideways in a third direction.

16. The vehicle of claim 15, wherein the vehicle further comprises a trailer hitch, wherein the light illuminates a region proximate to the trailer hitch.

17. The vehicle of claim 16, wherein the vehicle further comprises a trailer backup assist system for assisting with the operation of a trailer with the vehicle.

18. The vehicle of claim 17, wherein the imaging device and the lamp assembly are located on the vehicle to capture images in the region rearward of the vehicle.

19. The vehicle of claim 18, wherein the imaging device and the lamp assembly are laterally offset from one another.

20. The vehicle of claim 15, wherein the lamp assembly further comprises a light pipe, operatively coupled between the light collimator and the hybrid optic lens to transmit the beam of collimated light, wherein the hybrid optic lens diverges the light to form a divergent beam pattern.

* * * * *